June 20, 1944.   A. R. SWENSON   2,351,722
WELDING APPARATUS
Filed Jan. 20, 1942   2 Sheets-Sheet 1
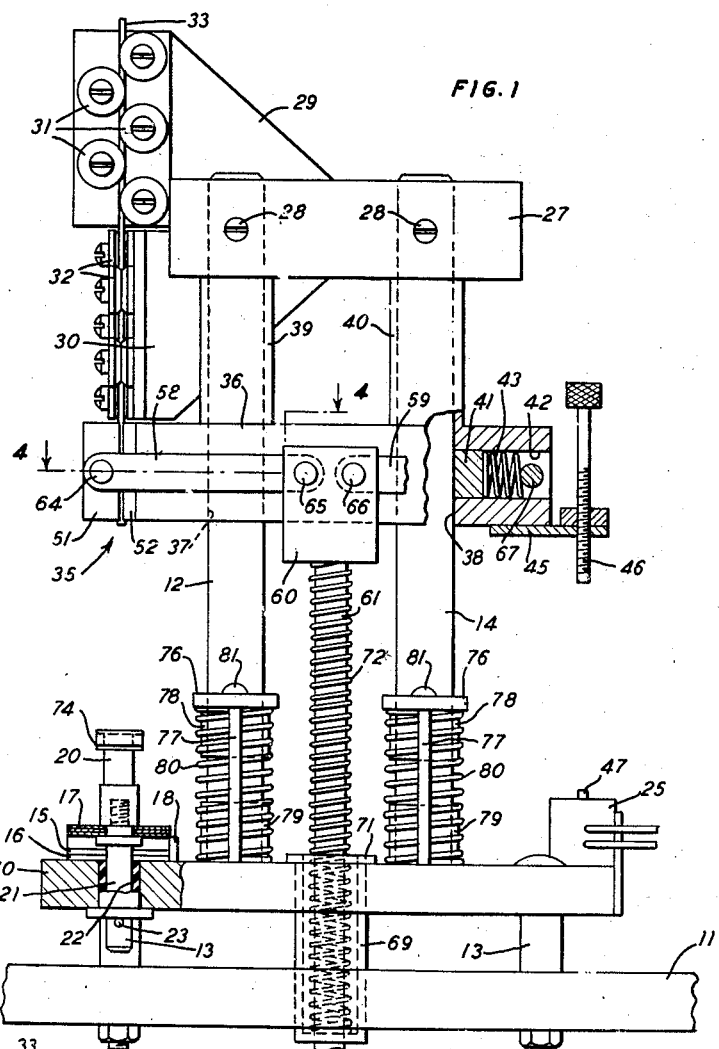
INVENTOR
A.R. SWENSON
BY
E.R. Nowlan
ATTORNEY

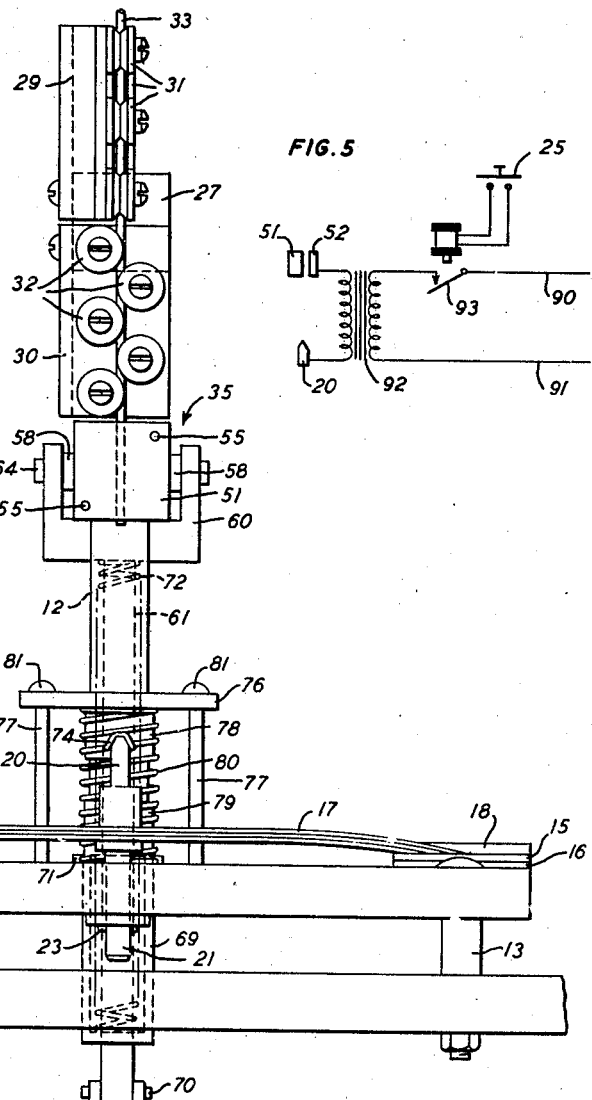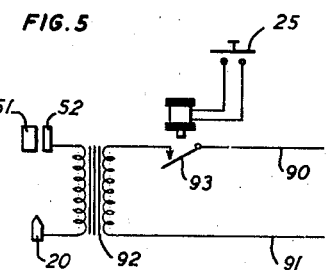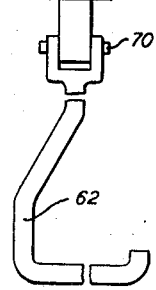

Patented June 20, 1944

2,351,722

UNITED STATES PATENT OFFICE 2,351,722

WELDING APPARATUS

Arthur R. Swenson, Fanwood, N. J., assignor to Western Electric Company, Incorporated, New York, N. Y., a corporation of New York Application January 20, 1942, Serial No. 427,422

10 Claims. (Cl. 219—4)

This invention relates to welding apparatus, and more particularly to apparatus for butt welding wire leads to other parts.

An object of the invention is to provide a welding apparatus which is simple in structure yet highly efficient in feeding lengths of material to a part and butt welding the material to the part.

With this and other objects in view, the invention comprises a welding apparatus having relatively movable electrodes, one adapted to support a part and the other adapted to grip a material and feed a predetermined variable length of the material to the part, means being provided to complete a welding circuit through the electrodes to effect welding of the material to the part when engagement of the material and part has been completed.

Other objects and advantages will be apparent from the following detailed description when taken in conjunction with the accompanying drawings, wherein Fig. 1 is a side elevational view of the welding apparatus in open position, portions thereof being shown in section;

Fig. 2 is a fragmentary side elevational view of the welding apparatus in closed position;

Fig. 3 is a front elevational view of the welding apparatus;

Fig. 4 is a fragmentary sectional view taken along the line 4—4 of Fig. 1; and

Fig. 5 is a wiring diagram of the welding circuit.

Attention is now directed to the drawings, which illustrate a base 10 mounted upon a suitable support 11, such as a bench, and having spaced uprights 12 and 14 rigidly mounted thereon and extending vertically therefrom as shown in Fig. 1. It will be observed that the base 10 is spaced from the support 11 by tubular members 13 through which suitable bolts extend to secure the base to the support. The base 10, near its forward edge, has spaced supporting blocks 15 rigidly mounted against movement by suitable means (not shown) and insulated from the base by insulating members 16. Companion leaf springs 17, of the contour illustrated in Fig. 3, are disposed with their ends resting on the blocks 15 adjacent vertical integral portions 18 of the blocks, the latter serving to hold the springs against displacement. An electrode 20 of any desired structure, for example of the contour illustrated in Figs. 1 and 2, is mounted centrally of the springs 17 with a control member 21 threadedly connected thereto and projecting through aligned apertures of the springs. The control member 21 is slidably disposed in an insulating bushing 22 mounted in the base 10 and serves to maintain the electrode in a truly perpendicular plane with respect to the base 10. A pin 23 carried by the control member 21 limits the upward movement of the electrode 20 and maintains the springs 17 suitably compressed. The electrode 20 may be included in a welding circuit which is under the control of a microswitch 25, the latter being mounted on the base 10 as shown in Fig. 1.

An adjustable head 27, apertured to receive the upper ends of uprights 12 and 14, is adapted, through the aid of screws 28, to be mounted at desired variable positions on the uprights for purposes hereinafter described. The head 27 supports brackets 29 and 30, these brackets in turn supporting series of wire straightening rolls 31 and 32, the axes of the rolls 31 being disposed in planes at right angles to the planes of the axes of the rolls 32 to serve to straighten a material, such as a wire 33, when pulled through the series of rolls.

Beneath the head 27, a movable electrode and wire feeding mechanism, indicated generally at 35, is disposed. This mechanism includes a body or cross member 36, apertured at 37 and 38 to receive the uprights 12 and 14 for movement of the body vertically on the uprights. Tubular members 39 and 40 are fixed to or made integral with the body 36 concentric with the apertures 37 and 38 respectively, as well as the uprights 12 and 14, for sliding movement on the uprights. This movement of the members 39 and 40, as well as the movement of the body 36 on the uprights, is controlled by the head 27, the members 39 and 40 abutting against the head when in the normal or open position. Friction shoes 41 are disposed in apertured ends 42 of the body and are backed up by compressed springs 43 to allow movement of the body relative to the uprights, yet to hold the body against movement by the force of gravity, unless sufficient force is provided to accomplish that result. At one end of the body, that is the rearmost end, a bracket 45 is mounted and supports an adjustable screw 46, the latter being positioned in alignment with a plunger 47 of the micro-switch 25, to effect actuation of the switch through the plunger when the body 36 has been lowered a predetermined distance.

At the opposite end, that is the front end of the body 36, an electrode unit is mounted. The unit is composed of two parts, identified specifically at 51 and 52, these parts being in the present instance substantially square in cross section and having aligned apertures 53 and 54 respectively (Fig. 4) to receive supporting pins 55. The pins have their inner ends rigidly mounted in the body 36, in the relative position shown in Fig. 3. the outer ends of the pins being adapted to movably support parts 51 and 52 of the electrode unit. If desired, the part 52 may be made rigid on the pins, it being important, however, that the part 51 be movable thereon. The means to impart movement to the electrode part 51, to grip the wire 33 in companion V-grooves 56 and 57 of the parts 51 and 52 respectively (Fig. 4), consists of sets of links 58 and 59 connected, through a yoke 60, to a pull rod 61, the latter being movable through a foot treadle or element 62 (Fig. 3).

Referring first to the links 58, it will be observed that these links are disposed one upon each side of the body 36, the forward ends of the links being pivotally connected to the outer ends of a pin 64, the latter extending through the electrode part 51 as shown in Fig. 4. The inner ends of the links 58 are pivotally connected, through the aid of pins 65, to the sides of the yoke 60, the latter being U-shaped in general contour, providing a central portion extending beneath the body 36 and adapted to abut against the body when in one position, the sides of the yoke being positioned one upon each side of the body. The links 59 have their inner ends secured in a similar manner to the sides of the yoke 60, through the aid of pins 66. The outer or rearmost ends of the links 59 are pivotally mounted on a pin 67 which extends through the body 36, serving also as an abutment for the adjacent spring 43 in the aperture 42.

Referring now to the pull rod 61, it will be observed that this rod is connected, in any suitable manner, at its upper end to the yoke 60 and extends downwardly, through a cup 69, to a suitable position beneath the support 11, where the treadle or element 62 is pivotally connected thereto as at 70. The cup 69, disposed in aligned apertures in the base 10 and support 11, has an integral flange 71 at its upper end resting upon the upper surface of the base, the cup in general being cylindrical in contour with a partially closed lower end to support the lower end of a spring 72, the latter being disposed concentric with the pull rod 61 and engaging the under surface of the yoke 60 to serve as means to force the entire feeding mechanism, including the electrode parts, into open position.

Means is provided to cause upward movement of the feeding mechanism with the wire and a part 74 to which the wire is welded after the welding operation has been completed, to free the part from the electrode 20 before the feeding mechanism releases the wire. This means consists of abutting elements 76, centrally apertured for the uprights 12 and 14 and apertured adjacent their outer ends for guide pins 77. Sleeves 78, disposed concentric with the uprights 12 and 14, are disposed beneath the elements 76 and rigidly secured thereto or made integral therewith. Similar sleeves 79, disposed concentric with the uprights 12 and 14, are supported by the base 10 or secured thereto. Attention is directed to the distance the sleeves 78 and 79 of each set are spaced from each other when the apparatus is in the open position shown in Fig. 1. Compression springs 80 are disposed concentric with the sets of sleeves between the base 10 and the respective elements 76, to normally urge the elements upwardly against heads 81 of the pins 77.

Fig. 5 illustrates a simple welding circuit which may be employed to perform the welding of the material to the part. This circuit includes supply lines 90 and 91 connected to the primary winding of a transformer 92 through the control of the micro-switch 25 and a relay operated control 93. The secondary winding is connected to the elecrodes 20 and 51—52. It is believed that a further description of the welding circuit is not necessary for a clear understanding of the invention. Furthermore, other electrical units may be included in the circuit, if so desired, to control the electrical energy employed and the time desired for each weld.

Upon considering the operation of the apparatus, let it be assumed that the wire 33 is supplied from a supply spool (not shown) suitably mounted. The part 74 in the present embodiment is substantially U-shaped in cross section and the electrode 20 is constructed to substantially conform to the part so that the part, when once located upon the electrode, will be supported thereby. The wire 33 is severed after each welding operation, a suitable distance below the upper electrode unit, this distance depending upon the diameter of the wire and possibly the type of material of which it is composed. When a part 74 has been disposed upon the electrode 20 the operator may then apply pressure downwardly on the treadle or element 62, effecting downward movement of the pull rod 61 against the force of the spring 72 and similar downward movement of the yoke 60. The first portion of the downward movement of the yoke 60 effects gripping of the wire through the association of the links 58 and 59 with the electrode part 51. The rearward ends of the links 59 being mounted upon a fixed pivot causes any out of line movement of the links to move the electrode part 51 toward the part 52, resulting in a gripping of the wire in the vertical V-grooves 56 and 57. The friction shoes 41 hold the body 36 against movement during this portion of the gripping operation. Thus the wire is gripped before downward movement of the body 36 begins. Continued downward movement of the pull rod 61 causes downward movement of the body through the yoke 60 and the links 58 and 59. During this downward movement of the body and the upper electrode, the wire 33 is drawn between the series of straightening rolls 31 and 32, effecting straightening of the wire. The body, in its downward movement, strikes first the elements 76, to move the elements against the force of the springs 80 to the position shown in Fig. 2, where the sleeves 78 rest upon the sleeves 79. However, before the feeding mechanism, including the body and the upper electrode, is lowered to the position shown in Fig. 2, the end of the wire is brought into engagement with the part 74, which, with the electrode 20, is moved downwardly against the force of the springs 17, after which the screw 46 causes actuation of the switch 25, through its engagement with the plunger 47, to effect energization of the welding circuit. The welding operation will effect softening of the material of the wire and the part at the meeting points. The force of the springs 17, which at this time are compressed, will provide the necessary push-up of the electrode 20 and the part for the necessary flow of the material during the welding operation.

After a sufficient lapse of time required for the completion of the welding of the wire and the part, the operator may then release the downward force of the element 62, to allow the movable parts to return to their normal or open positions. First, the elements 76, through the force of their springs 80, will effect upward movement of the feeding mechanism before the electrode parts 51 and 52 are allowed to release the wire, the purpose being to move the welded part with the wire free of the electrode 20. At the extreme beginning of the upward movement of the mechanism, the switch 25 is open, thus opening the welding circuit to the electrodes. The combined force of the springs 80 is greater than the force of the spring 72, effecting advanced movement of the body 36 during the releasing of the treadle or element 62, until the elements 76 have reached the limit of their movements, at which time the body 36 will remain against movement through the holding force of the friction shoes 41 until the yoke is moved upwardly to a point where its central portion will engage the body. During this relative movement of the yoke and the body, the links 58 and 59 are caused to function to move the electrode part 51 outwardly free of the wire 33. Furthermore, movement of the yoke 60 upwardly, through the force of the spring 72, will effect upward movement of the feeding mechanism relative to the wire until this movement is stopped by the tubular members 39 and 40 engaging the head 27. At this time suitable wire cutters may be employed to cut the wire a desired distance beneath the under surface of the upper electrode parts 51 and 52. At this time the welded parts, namely the length of wire and the part 74, may be disposed in any suitable receptacle, thus conditioning the apparatus to perform another welding operation. The length of the wire welded to the part may be varied by varying the position of the head 27 on the uprights 12 and 14 relative to the electrode 20. The length of the wire is determined by the normal open positions of the body 36 from the elements 76 minus the length of the wire left extending beneath the upper electrode parts. Therefore, by varying this distance, through the adjustment of the head 27, the length of the wire may be varied.

It is, therefore, evident that the apparatus includes an electrode mounted upon resilient means which function to provide the necessary push-up during the welding operation. The apparatus also includes a combined gripping and feeding mechanism variable in its movement to grip and feed variable lengths of wire or material to the part, this mechanism having an associated control, through the elements 76, to limit the time interval of its actuation during movement into the open position, to effect movement of the welded parts free of the lower electrode, allowing free removal of the welded parts through the aid of a suitable cutting tool.

Although specific improvements of the invention have been shown and described it will be understood that they are but illustrative and that various modifications may be made therein without departing from the scope and spirit of this invention as defined by the appended claims.

What is claimed is:

1. A welding apparatus comprising an electrode to singly support parts to be welded, an electrode adapted to grip a wire, an electrical welding circuit including the electrodes, an electrical switch to control the welding circuit, means to move the gripping electrode from a normal position to a welding position to singly move lengths of wire to the parts, means to subsequently actuate the switch to close the circuit, and means to vary the said normal position of the gripping electrode to vary the lengths of wire moved thereby to the parts.

2. A welding apparatus comprising an electrode to support parts to be welded, an electrode adapted to grip a wire, actuable means to cause the gripping electrode to grip the wire for movement of the wire into engagement with the part for welding, means to effect welding of the wire and the part together, and means to move the gripping electrode to move the welded part free of the supporting electrode.

3. A welding apparatus comprising an electrode to support a part to be welded, an electrode adapted to grip a wire, actuable means to cause the gripping electrode to grip the wire for movement of the wire into engagement with the part for welding, means to effect welding of the wire and the part together, and means to move the gripping electrode to move the welded wire and part a predetermined distance from the supporting electrode and render the said actuable means ineffective to release the wire during the said movement.

4. A welding apparatus comprising an electrode to support a part to be welded, a gripping unit adapted to grip material to be welded to the part, means to move the gripping unit to move the material into engagement with the part, means to effect welding of the material and the part together, and means to move the gripping unit to remove the welded part free of the electrode and maintain the gripping unit in gripping position during said movement.

5. A welding apparatus comprising an electrode to support a part to be welded, a gripping unit adapted to grip material to be welded to the part, means to move the gripping unit from a normal position to feed a predetermined length of the material to the part, means to effect welding of the material and the part together, means to move the gripping unit away from the electrode, and means to maintain the unit in gripping engagement with the material during a portion of the last mentioned movement.

6. A welding apparatus comprising an electrode to support a part to be welded, a gripping unit adapted to grip material to be welded to the part, means to move the gripping unit from a normal position to a welding position to feed a predetermined length of the material to the part, means to effect welding of the material and the part together, means to move the gripping unit away from the electrode and to the normal position, and means to maintain the unit in gripping engagement with the material during a portion of the last mentioned movement, means to vary the movement of the gripping unit, the said predetermined length of the material being variable by varying the remainder of the movement of the gripping unit away from the electrode to the normal position.

7. A welding apparatus comprising an electrode to support a part to be welded, a gripping unit adapted to grip material to be welded to the part, means to move the gripping unit from a normal position to feed a predetermined length of the material to the part, means to effect welding of the material and the part together, means to move the gripping unit away from the electrode, means to maintain the unit in gripping engagement with the material during a portion of the last mentioned movement, and means to vary the distance of the normal position relative to the electrode to vary the length of the material fed to the part.

8. A welding apparatus comprising an electrode to singly support parts to be welded, elements to straighten material passing therebetween, means to pull successive lengths of the material from between the elements and feed them singly to the parts, means including the electrode rendered effective after each feeding operation to cause welding of the lengths of material to their respective parts, and means to vary the action of the pulling means to vary the said lengths of material.

9. A welding apparatus comprising a gripping unit adapted to grip material to be welded to the part, means to move the gripping unit to move the material into engagement with the part, a member to movably support the unit and guide the unit relative to the electrode, means to effect welding of the material and the part together, and means to move the gripping unit to remove the welded part free of the electrode and maintain the gripping unit in gripping position during said movement.

10. A welding apparatus comprising a gripping unit adapted to grip material to be welded to the part, means to move the gripping unit to move the material into engagement with the part, a member to movably support the unit and guide the unit relative to the electrode, means to effect welding of the material and the part together, means to move the gripping unit to remove the welded part free of the electrode and maintain the gripping unit in gripping position during said movement, and friction means interposed between the gripping unit and the said supporting member to hold the unit against accidental movement on the member.

ARTHUR R. SWENSON.